United States Patent [19]

Anderson et al.

[11] Patent Number: 4,787,245

[45] Date of Patent: Nov. 29, 1988

[54] TORQUE MEASURING APPARATUS FOR VALVE OPERATING SYSTEM

[75] Inventors: Paul G. Anderson; John A. McMennamy, both of Cobb County, Ga.

[73] Assignee: Movats Incorporated, Marietta, Ga.

[21] Appl. No.: 50,239

[22] Filed: May 13, 1987

[51] Int. Cl.⁴ .......................................... G01M 19/00
[52] U.S. Cl. .................................. 73/168; 73/862.23
[58] Field of Search ............... 73/168, 862.31, 862.32, 73/862.27

[56] References Cited

U.S. PATENT DOCUMENTS

| | | | |
|---|---|---|---|
| 4,498,336 | 2/1985 | Dalton | 73/168 |
| 4,542,649 | 9/1985 | Charbonneau et al. | 73/168 |
| 4,570,903 | 2/1986 | Crass | 73/862.81 X |
| 4,693,113 | 9/1987 | McNennamy et al. | 73/168 |

Primary Examiner—Daniel M. Yasich
Attorney, Agent, or Firm—Louis T. Isaf

[57] ABSTRACT

An apparatus for monitoring, measuring and recording rotational forces and torque within a valve actuator comprises a load cell supported between two arm members, one arm member being mounted stationary to the housing of the valve actuator and the other arm being interfaced for rotation with a worm gear within the actuator. The resulting connection between the two arm members, through the load cells, results in blocked rotation of the worm gear and development of torque within the actuator, which torque is monitored through measurement of the rotational force at the load cell and knowledge of the moment arm of the force at the load cell. A time related trace of the torque is provided and comparison and correlation is made to time traces of other system parameters.

7 Claims, 3 Drawing Sheets

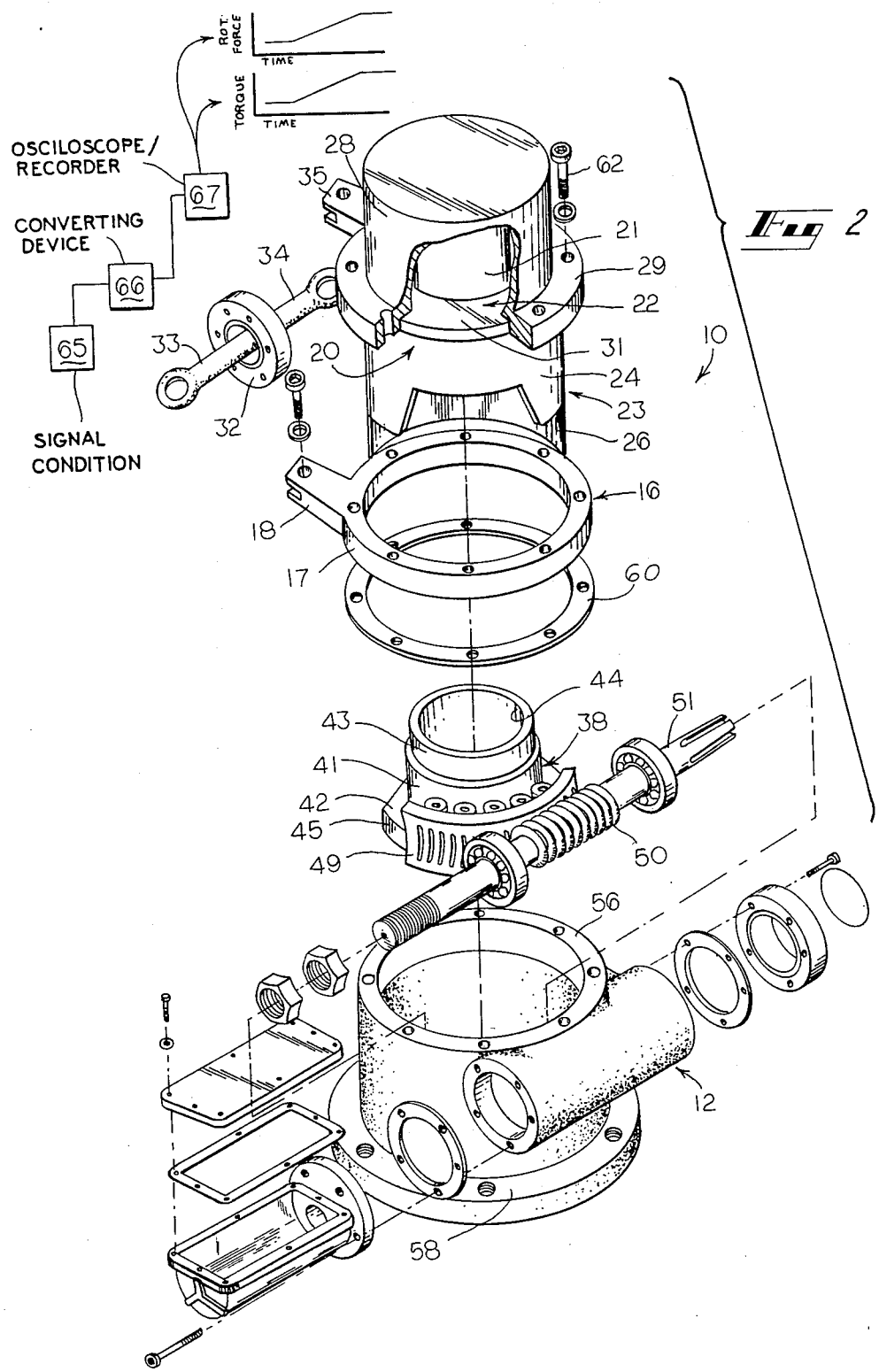

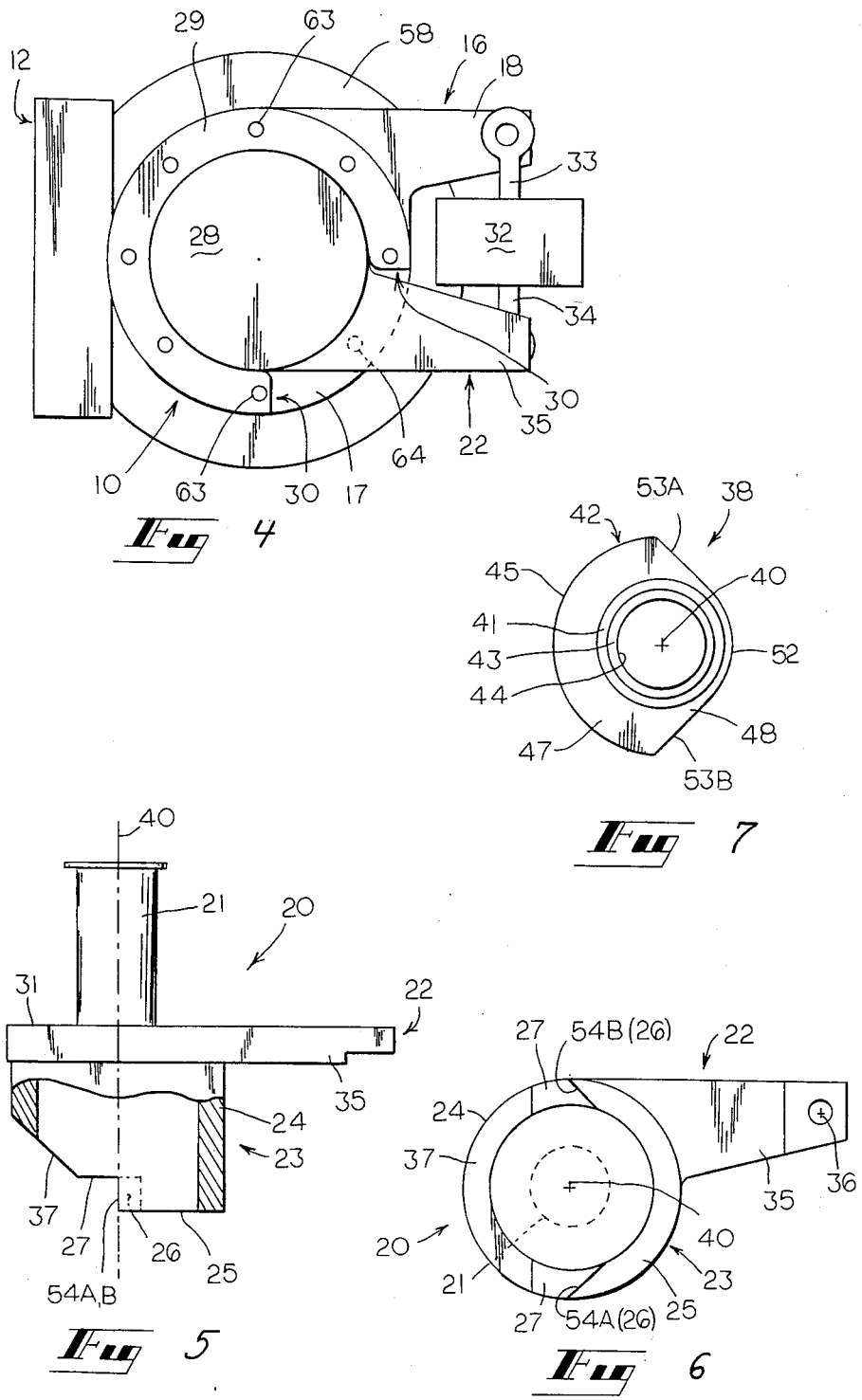

TORQUE MEASURING APPARATUS FOR VALVE OPERATING SYSTEM

FIELD OF THE INVENTION

The present invention relates generally to the field of testing and analysis of valve operating systems, and more specifically to apparatus for monitoring, measuring and recording rotational force and torque within a valve operating system.

BACKGROUND OF THE INVENTION

The concept of actually monitoring the effects of rotational forces within a valve operator was first practiced by the inventions of Charbonneau et al disclosed in U.S. Pat. No. 4,542,649 and in U.S. patent application Ser. No. 850,761. The specific apparatuses disclosed in the Charbonneau patent and patent application do not find application on all valve operator and actuator designs or in all use environments. As a result of the great variety of actuator designs and applications found in operation throughout the country and the world, it has become desirable to create specialized apparatus for measuring rotational force and torque within the valve operator and/or actuator.

SUMMARY OF THE INVENTION

Briefly described, the present invention comprises an improved torque measuring apparatus for measuring rotational forces and determining system torques within an actuator. The apparatus of the present invention includes a stationary arm member, to which is mounted a load cell, and a moving arm member which engages the gear plate of an actuator worm gear for rotation with the worm gear about a common, axis of rotation. The moving arm member engages the load cell held at the stationary arm member, rotation of the moving arm member being thereby blocked. As rotation of the moving arm member is blocked, rotation of the worm gear to which the moving arm member is engaged is prevented. Thus, counter-rotational forces are generated at the moving arm member and in the worm gear, developing a torque within the system. The counter-rotational force (and thus the rotational force) is monitored at the load cell over a period of time and measured and recorded. A time related trace of the rotational force is created.

In the preferred embodiment, the stationary arm member is mounted to the actuator housing at the location of the upper bearing cap and the moving arm member comprises a coupling member accessing the worm gear from the location of the upper bearing cap. In this way, the apparatus of the present invention is mounted to the actuator and operated while the actuator is connected to and is driving the valve stem and valve. Preferably, the composite apparatus of the present invention includes components of the Motor Operated Valve Analysis and Testing System of the Charbonneau et al U.S. Pat. No. 4,542,649. Thereby, one or more other operating system parameters are monitored over the time period, such as motor current, torque switch position and limit switch position. Time related traces of one or more of the other system parameters is (are) generated and correlated to the torque/time curve for purposes of evaluation and analysis of the operating system condition and operation.

It is, therefore, one object of the present invention to provide an improved torque measuring apparatus which interfaces with the worm gear of a valve actuator.

Another object of the present invention is to provide an improved torque measuring apparatus which generates, measures and records system torque while the valve operating system is connected to and is driving the valve stem and valve.

Other objects, features and advantages of the present invention will become apparent upon reading and understanding the present specification when taken in conjunction with the accompanying drawings.

BRIEF DESCRIPTION OF THE DRAWINGS

FIG. 2 is an exploded view of the torque measuring apparatus in accordance with the present invention, in conjunction with a valve actuator.

FIG. 4 is a top view of the torque measuring apparatus of FIG. 2.

FIG. 5 is an isolated side view of a movable arm member in accordance with the present invention.

FIG. 6 is a bottom view of the movable arm member of FIG. 5.

FIG. 7 is a top view of the worm gear of the valve actuator of FIG. 2.

DETAILED DESCRIPTION OF THE PREFERRED EMBODIMENT

Figure 1:
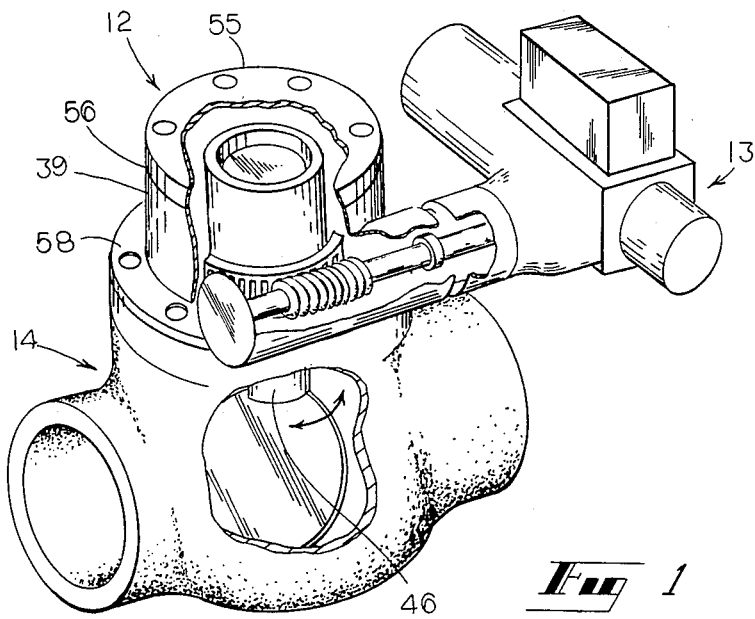
FIG. 1 is a pictorial view of one embodiment of a typical valve operating system acted upon by the present invention.

Referring now in greater detail to the drawings in which like numerals represent like components throughout the several views, FIG. 1 shows the torque measuring apparatus 10 of the present invention as it is used in its most preferred embodiment with a quarter-turn valve actuator 12 driven by a motor operated valve operator 13. The valve operator 13 and quarter-turn valve actuator 12, in combination, comprise what is referred to throughout this disclosure as the valve operating system. The operating system is mounted to a valve housing 14 within a fluid conduit network.

An example of a valve operating system to which the torque measuring apparatus 10 is connected, is seen in FIGS. 1 and 2 as comprising a worm gear 38 mounted for rotation within a gear box 39. The worm gear 38 includes a cylindrical shaft portion 41 and a gear plate 42. The worm gear 38 is mounted within the gear box 39 for rotation about the longitudinal axis 40 (the axis of rotation 40) of the shaft portion 41. In typical embodiments, the shaft portion 41 is comprised of an added, cylindrical sleeve element 43 which is splined to the original inner wall of the worm gear 38. The inner periphery 44 of the worm gear 38 (defined for purposes of this disclosure as including the sleeve element 43) is keyed to accept a stem nut or a valve stem 46. The drawings of the preferred embodiment depict a quarter-turn actuator 12, such as that which drives a butterfly valve; and, thus, in the preferred embodiment, the inner periphery 44 is keyed to a valve stem 46 such that the valve stem rotates with the worm gear 38. With reference to FIG. 7, which is a top view of the isolated worm gear 38, the tapered configuration of a typical gear plate 42 is seen. The gear plate 42 comprises a circular segment 47 which bears an arc-shaped row of gear teeth 49 along its outer periphery 45, and a tapered segment 48.

The tapered segment 48 defines tapered edges 53A, 53B and an arcuate edge 52. The row of gear teeth 49 is in driven engagement with a worm 50 which worm is driven by a worm shaft 51. In the disclosed embodiment, the row of gear teeth 49 of the worm gear 38 extends about a sufficient distance of the outer periphery of the circular segment 47 to allow for quarter turn actuation of the worm gear.

Figure 3:
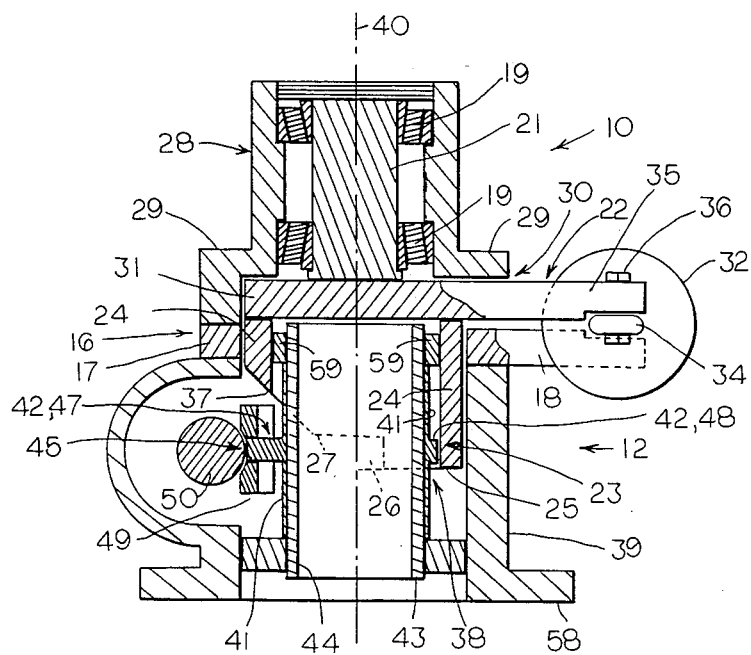
FIG. 3 is a cutaway, side view of the torque measuring apparatus and valve actuator of FIG. 2.

As seen in greater detail in FIGS. 2-4, the torque measuring apparatus 10 comprises a stationary torque arm 16 which includes a cylindrical rim 17 and a protruding lever segment 18. The apparatus 10 also includes a movable torque arm 20 which includes a shaft member 21, a protruding arm member 22 rigidly attached to the shaft member and extending perpendicular to the shaft member, and a coupling member 23 which is rigidly attached to and extends below the arm member 22. The arm member 22 includes a disc segment 31 and a lever segment 35. The coupling member 23 (with reference to FIGS. 5 and 6) comprises a cylindrical body 24 mounted to the disc segment 31 of the arm member 22. The free end of the body 24 is formed in "steps" to include a lowermost rim 25, a worm gear interfacing segment 26 and a second rim 27. In the embodiment disclosed in the drawings, the coupling member 23 also includes a slanted face 37.

The upper shaft member 21 is mounted, for rotation, in bearings 19 within a housing 28. The housing 28 (also referred to as the TMA housing 28) is formed with an annular rim 29 which encircles the disc segment 31 of the arm member 22. It is seen that the annular rim 29 has an arcuate window 30 formed therein along at least a portion of its circumference, and through which the lever segment 35 of the arm member 22 protrudes. A load cell 32 is supported between the lever segments 18, 35 of the stationary torque arm 16 and moveable torque arm 20. Support pins 33, 34 attach opposite sides of the load cell 32 to the respective lever segments 18, 35.

Assembly. Typically, the gear box 39 of the valve actuator 12 comprises an upper bearing cap 55 (see FIG. 1) bolted to the upper gear box rim 56 and a lower, annular flange 58 by which it is mounted to the valve housing 14. For assembly purposes, the upper bearing cap 55 is removed and the torque measuring apparatus 10 is mounted to the gear box 39 at the upper gear box rim 56. The stationary torque arm 16 rest on the gear box rim 56 with a gasket 60 therebetween. The movable torque arm 20 is mounted at its shaft member 21 in the bearings 26 within the TMA housing 28 and the assembled TMA housing 28 and moveable torque arm 20 unit is lowered into place over the stationary torque arm 16. The lower coupling member 23 extends into the gear box 42 to interface with the worm gear 38. In proper position, the annular rim 29 of the TMA housing 28 rests on the cylindrical rim 17 of the stationary torque arm 16 and the cylindrical body 24 of the coupling member 23 encircles the cylindrical shaft portion 41 of the worm gear 38. Bearings 59 are placed between the drive sleeve 43 and the coupling member 24.

The coupling member 23 is formed to conform generally to the shape of the gear plate 42 of the worm gear 38. Thus, the body 24 of the coupling member 23 is of a length that the lowermost rim 25 extends below top surface 57 of the gear plate 42; the body 24 has inside radius which matches or exceeds the radius of the arcuate edge 52 of the tapered segment 48 of the gear plate; the walls 54 of the interfacing segment 26 are angled to match the taper of the tapered edge 53 of the gear plate tapered segment 48; the second rim 27 is set above the top surface 57 of the gear plate 48; and, the slanted face 37 is cut to avoid the row of gear teeth 49. It is noted that in many valve operating systems, the row of teeth 49 is cut directly into the outer peripheral edge 45 of the gear plate 48, in which case the slanted face 37 of the coupling member 23 is not required. It is understood that the scope of the invention is not limited to the exact configuration of the coupling member 23; rather, as expressed above, the exact configuration of the coupling member 23 is to be conformed generally to the worm gear 38, and especially gear plate 42, of the valve operating system being tested, to effect the basic operation as expressed herein.

With the TMA housing 28 and movable torque arm 20 in proper position and alignment, bolts 62 are extended through aligned bolt holes 63 in the annular rim 29 of the TMA housing 28 and cylindrical rim 17 of the stationary torque arm 16 to bolt those components rigidly to the upper gear box rim 56. With the movable torque arm 20, stationary torque arm 16 and TMA housing 28 in proper position on the gear box 42, the arm members 18, 22 of the two torque arms 16, 20 are aligned as seen in FIG. 3 and 4 with the load cell 32 attached to the respective arms and supported between them. There are no bolts 62 protruding through the annular rim 29 at the location of the window 30. Rather, the lever segment 35 of the movable torque arm 20 protrudes through this window 30, as seen. A short bolt 64 extends through the stationary arm rim 17 into the gear box 42, at the location of the window 30. In the preferred embodiment, the window 30 occupies approximately ninety degrees of the annular rim 29. As the movable torque arm 20 rotates within the TMA housing 28, the protruding arm member 22 moves freely along the length of the window.

Operation. With the torque measuring apparatus 10 assembled and mounted to the valve actuator 12 as expressed above, the worm shaft 51 is driven by a chosen means. For example, the worm shaft 51 is driven by a motor, or a hand wheel, or a valve operator 13, all as known in the industry. The driven worm shaft 51 drives the worm 50 which drives the worm gear 38 by engagement with the row of teeth 49. The worm gear 38 is driven in a rotating manner about its axis 40 of rotation, in either a clockwise or counter-clockwise direction. The alignment between the coupling member 23 and gear plate 42 is such that, as the worm gear 38 rotates about its axis 40 the tapered edges 53 of the gear plate tapered segment 48 (FIG. 7) will strike portions of the walls 54 of the interfacing segment 26 of the coupling member 23. That is, as the worm gear 38 rotates clockwise, tapered edge 53A (FIG. 7) of the gear plate 42 strikes wall portion 54A of the interfacing segment 26; and as the worm gear rotates counter-clockwise, tapered edge 53B of the plate strikes wall portion 54B of the interfacing segment. Once the gear plate 42 has struck the coupling member 23, the worm gear 38 drives the coupling member causing the shaft member 21 of the movable torque arm 20 to rotate within the TMA housing 28 about the common axis 40 of rotation. As the shaft member 21 rotates, the arm member 22 pivots about the axis 40 of rotation (along the housing window 30) and moves the lever segment 35 away from (or toward) the lever segment 18 of the stationary torque arm 16. As the lever segment 35 moves relative to the lever segment 18, the load cell 32 is pulled in tension (or pushed in compression) generating a measurable force at the load cell. The force exerted at the load cell 32 is transmitted by signal, in the typical manner known in the art, to the signal conditioner 65. The purpose of the signal conditioner 65 is to provide a conditioned power supply for the load cell 32; to provide local digital readout capability for the load cell; and to provide necessary subcomponents for generating and delivering the output signal to the converting device 66.

The load cell combination (including load cell 32 and support pins 33, 34) provides a counter-rotation force which resists rotation of the movable torque arm 20 and, thus, resists rotation of the worm gear 38. Such resistance develops a torque within the valve operating system. The torque thus developed is measured by the apparatus of the present invention by virtue of the fact that the torque measuring apparatus 10 has developed a measurable force (at the load cell 32) at a known radius from the axis 40 of rotation. The radius (or moment arm) is predetermined and premeasured as the radial distance from the central axis 40 of the movable torque arm shaft 21 to the pin 36 center of the lever segment 35. At the converting device 66 (acting as a calculating device), the necessary calculating functions are performed to convert the force sensed at the load cell 32 to a torque measurement by multiplying the measured force by the predetermined moment arm. Thus, the counter-rotational force measured at the load cell 32 and the torque generated in the valve actuator 12 over a period of time as a result of preventing rotation of the worm gear 38 are traced electronically and are displayed and/or recorded on an analytical device such as an oscilloscope 67 or other display and/or recording devices.

It is understood that the torque measuring apparatus 10 of the present invention comprises an improvement to known torque measuring systems and an improvement to known valve and valve operator testing and analysis systems. Thus, the preferred embodiments of the present invention generate torque measurements and time related torque traces which are correlated and compared with time related traces of other operator system parameters for purposes of diagnosing and analyzing the operating characteristics of the valve operator and/or actuator. For example, the torque/time traces of the present invention are correlated and compared to one or more of the time related traces of the torque switch position, limit switch position, motor current or spring pack displacement. For a better understanding of the prior art parameters and measurement, the reader is directed to Charbonneau et al U.S. Pat. No. 4,542,649, the specification of which is hereby incorporated by reference.

Whereas this inventin has been described in detail with particular reference to preferred embodiments thereof, it will be understood that variations and modifications can be effected within spirit and scope of the invention, as described hereinbefore and as defined in the appended claims.

We claim:

1. In combination:
   a stem driving gear mounted for rotation within a valve actuator housing about an axis of rotation, said stem driving gear including an inner surface in driving communication with a valve stem and an outer surface, said outer surface defining, at least, a gear engaging portion;
   a worm driven by a worm shaft and in driving communication with said gear engaging portion of said outer surface of said stem driving gear,
   a stationary member mounted to said actuator housing;
   a load measuring means mounted to said stationary member at a determinable distance from said axis of rotation of said stem driving gear for measuring a force generated threat;
   a moving member mounted for rotation about said axis of rotation of said stem driving gear, said moving member including, at least, a gear interfacing means for effecting rotation of said moving member with said stem driving gear, and said moving member further comprising load cell engaging means for engagement with said load measuring means at some point along the path of rotation of said moving member and at a determinable distance from said axis of rotation of said stem driving gear, and for generating, in cooperation with said stationary member and in response to said engagement, counter-rotation force at said load measuring means, which counter-rotation force resists rotation of said moving member about said axis of rotation,
   whereby the driven worm gear effects rotation of the stem driving gear about its axis of rotation, which effects rotation of the moving arm assembly about the axis of rotation and engagement of the moving arm assembly with the load measuring means and generation of force measured at the load measuring means.

2. The Combination of claim 1, further comprising means for displaying and recording force measured over a period of time at the load measuring means.

3. The combination of claim 2, further comprising means for converting the force measured at the load measuring means to torque values.

4. A torque measuring apparatus for measuring the torque in a valve operating system which includes, at least, a worm shaft driving a worm which drives a worm gear in rotating fashion within a valve actuator housing about an axis of rotation, wherein the worm gear includes, at least, an inner surface in driven communication with the worm, and wherein the outer surface defines, at least, a first arcuate edge of first radius, a second arcuate edge of second radius and at least one tapered edge between the first arcuate edge and the second arcuate edge, said torque measuring apparatus comprising:
   a stationary member mounted to said actuator housing;
   a moving member mounted for rotation with the worm gear about the axis of rotation;
   a coupling component including an attachment end attached to said moving member and including an interfacing end, said interfacing end including a tapered wall section in contact with the tapered edge of the outer surface of the worm gear, wherein said tapered wall section is in driven relationship with the tapered edge thus effecting rotation of the coupling component and of the moving member upon rotation of the worm gear;
   combination means for resisting relative movement of said stationary member and said moving member during driving of the worm gear, thus developing a counter-rotational force resisting rotation of said moving member about the axis of rotation and for measuring the counter-rotational force.

5. Apparatus of claim 4, further comprising means for displaying and recording the counter-rotational force measured over a period of time at said combination means.

6. Apparatus of claim 4, wherein said force measuring means comprises means for measuring the counter-rotational force at a predetermined distance radially displaced from the axis or rotation.

7. Apparatus of claim 6, further comprising calculating means for calculating the torque resulting from the counter-rotational force acting at said predetermined radial distance.

* * * * *